(12) United States Patent
Vogt

(10) Patent No.: US 10,639,566 B2
(45) Date of Patent: May 5, 2020

(54) FILTER ELEMENT OF A FLUID FILTER AND FLUID FILTER

(71) Applicant: MANN+HUMMEL GmbH, Ludwigsburg (DE)

(72) Inventor: Christian Vogt, Marbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/049,050

(22) Filed: Jul. 30, 2018

(65) Prior Publication Data

US 2018/0333663 A1 Nov. 22, 2018

Related U.S. Application Data

(63) Continuation of application No. PCT/EP2017/051975, filed on Jan. 31, 2017.

(30) Foreign Application Priority Data

Feb. 1, 2016 (DE) .................. 10 2016 001 025

(51) Int. Cl.
*B01D 29/21* (2006.01)
*B01D 29/23* (2006.01)
*B01D 35/00* (2006.01)
*B01D 35/153* (2006.01)
*B01D 35/16* (2006.01)

(52) U.S. Cl.
CPC ............ *B01D 29/21* (2013.01); *B01D 29/232* (2013.01); *B01D 35/005* (2013.01); *B01D 35/153* (2013.01); *B01D 35/16* (2013.01); *B01D 2201/291* (2013.01); *B01D 2201/305* (2013.01); *B01D 2201/316* (2013.01); *B01D 2201/34* (2013.01); *B01D 2201/342* (2013.01)

(58) Field of Classification Search
CPC .... B01D 29/21; B01D 35/005; B01D 29/232; B01D 2201/291; B01D 2201/342; B01D 2201/316; B01D 35/16; B01D 35/153; B01D 2201/34; B01D 2201/305
USPC .............................................. 210/450, 493.2
See application file for complete search history.

(56) References Cited

U.S. PATENT DOCUMENTS

2008/0047132 A1* 2/2008 Wieczorek ........... B01D 35/153
29/801

FOREIGN PATENT DOCUMENTS

| DE | 4330839 A1 | 3/1995 |
| DE | 2005013478 U1 | 1/2007 |
| WO | 2015176791 A1 | 11/2015 |

* cited by examiner

*Primary Examiner* — Madeline Gonzalez
(74) *Attorney, Agent, or Firm* — James Hasselbeck

(57) ABSTRACT

A filter element of a liquid filter has a filter medium surrounding an element interior with a radially inner and a radially outer circumferential side as inflow side for raw fluid and outflow side for clean fluid, respectively. A sealing element arrangement of a sealing device is arranged at a filter medium end face. The sealing device seals a fluid connection between a liquid discharge line of a filter housing and the raw fluid side or clean fluid side of the filter element. The sealing element arrangement has radially inner and radially outer sealing elements extending circumferentially relative to the element axis. The radially outer and radially inner sealing elements are concave, viewed from a pressure-loadable side of the filter element. The radially outer sealing element has a radially outwardly or inwardly extending sealing lip; the radially inner sealing element has a radially inwardly or outwardly extending sealing lip.

10 Claims, 5 Drawing Sheets

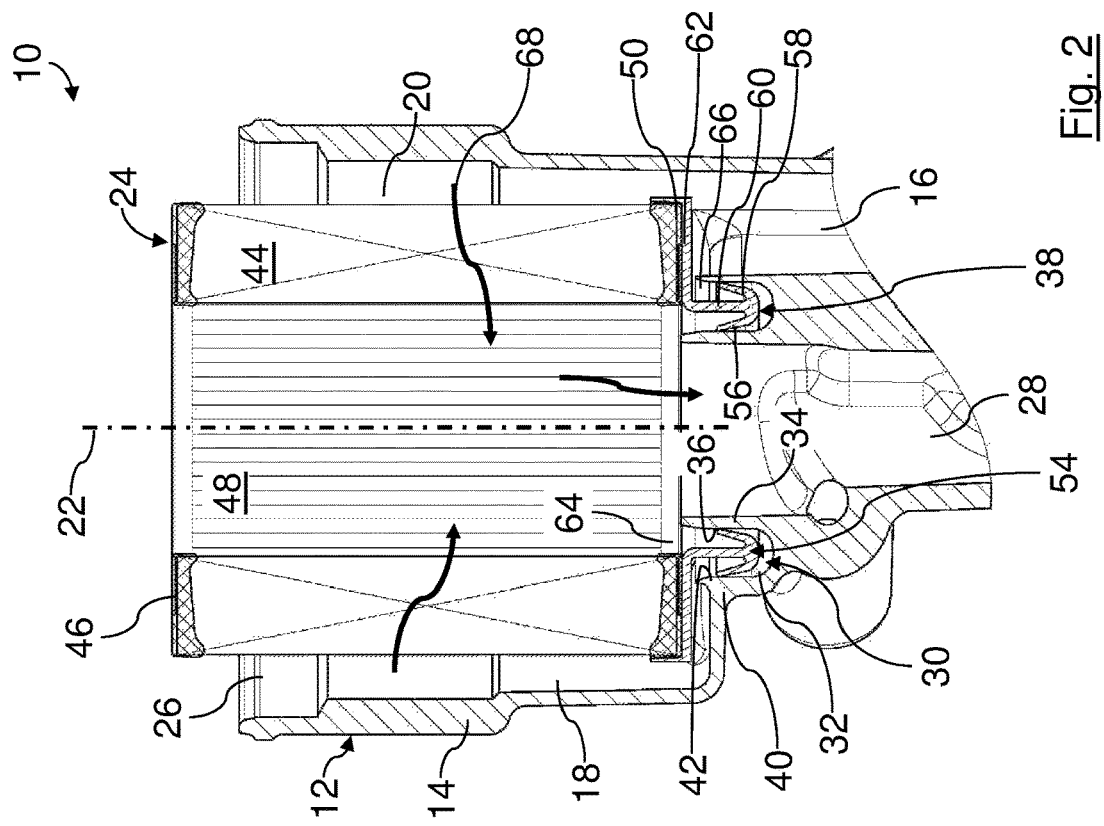
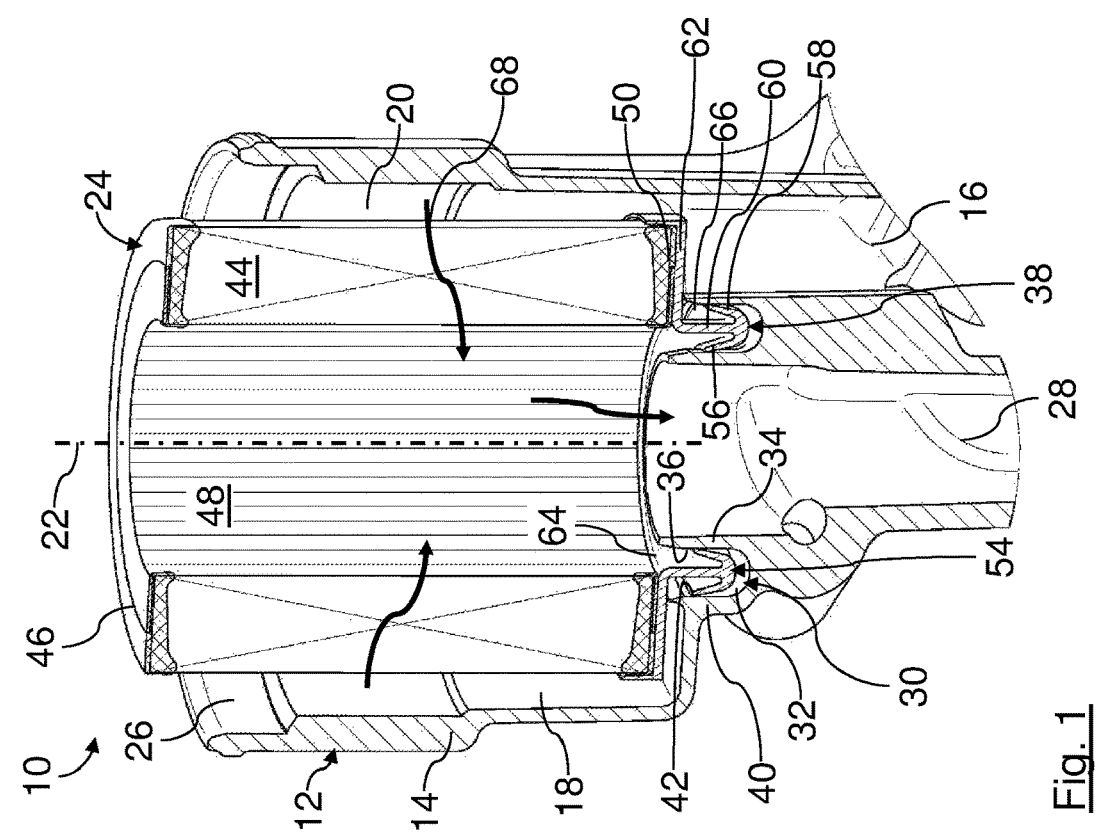

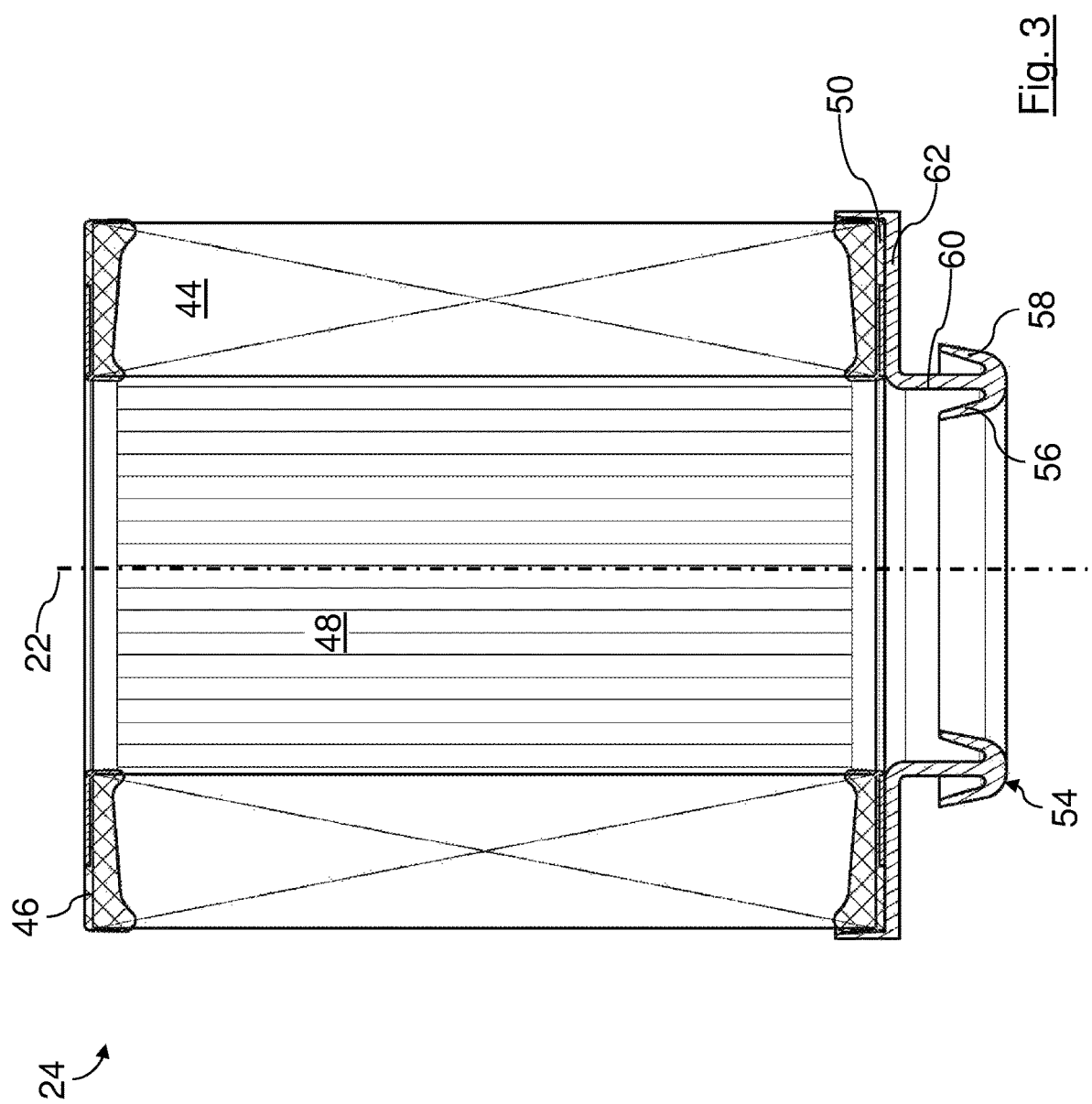

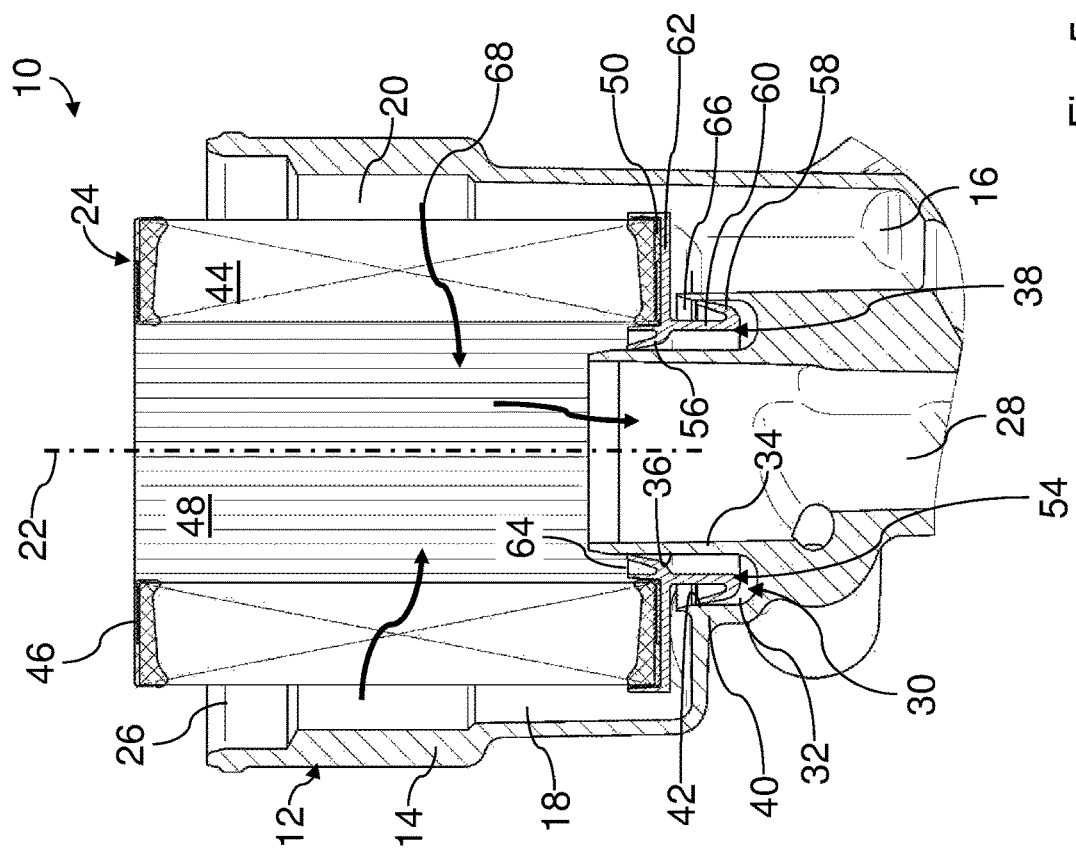
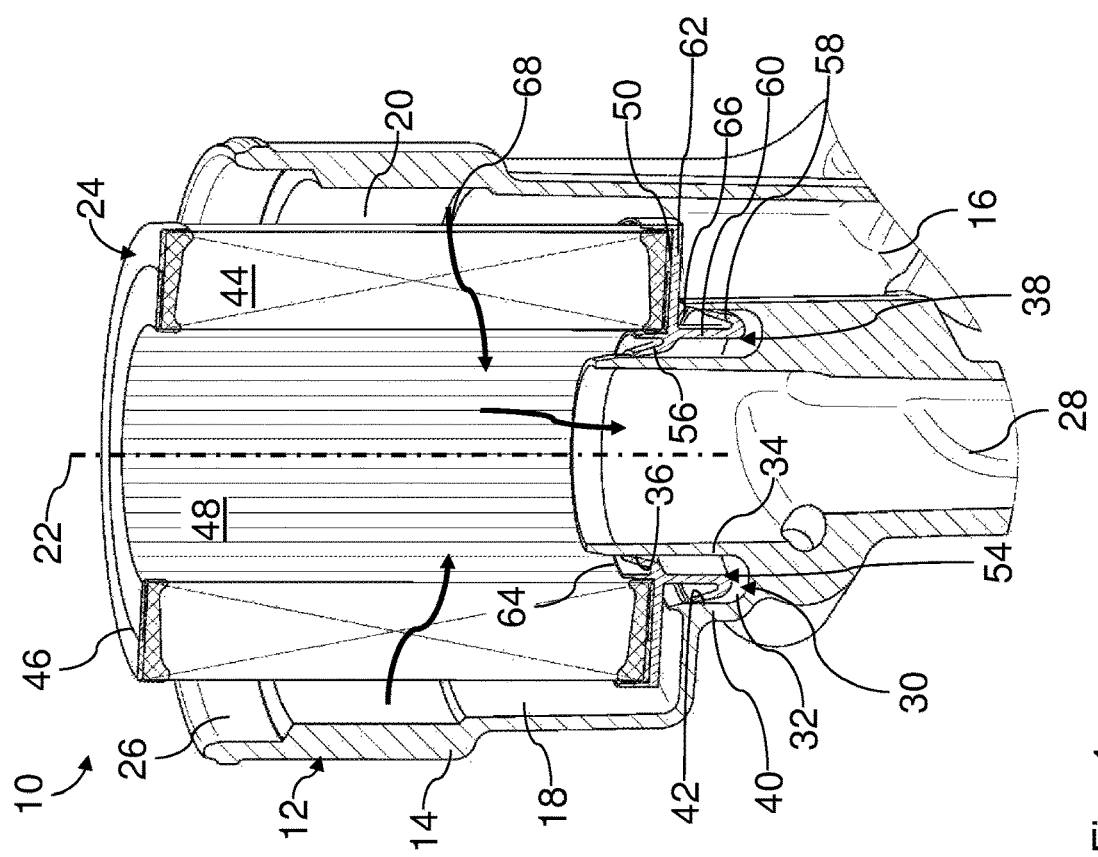

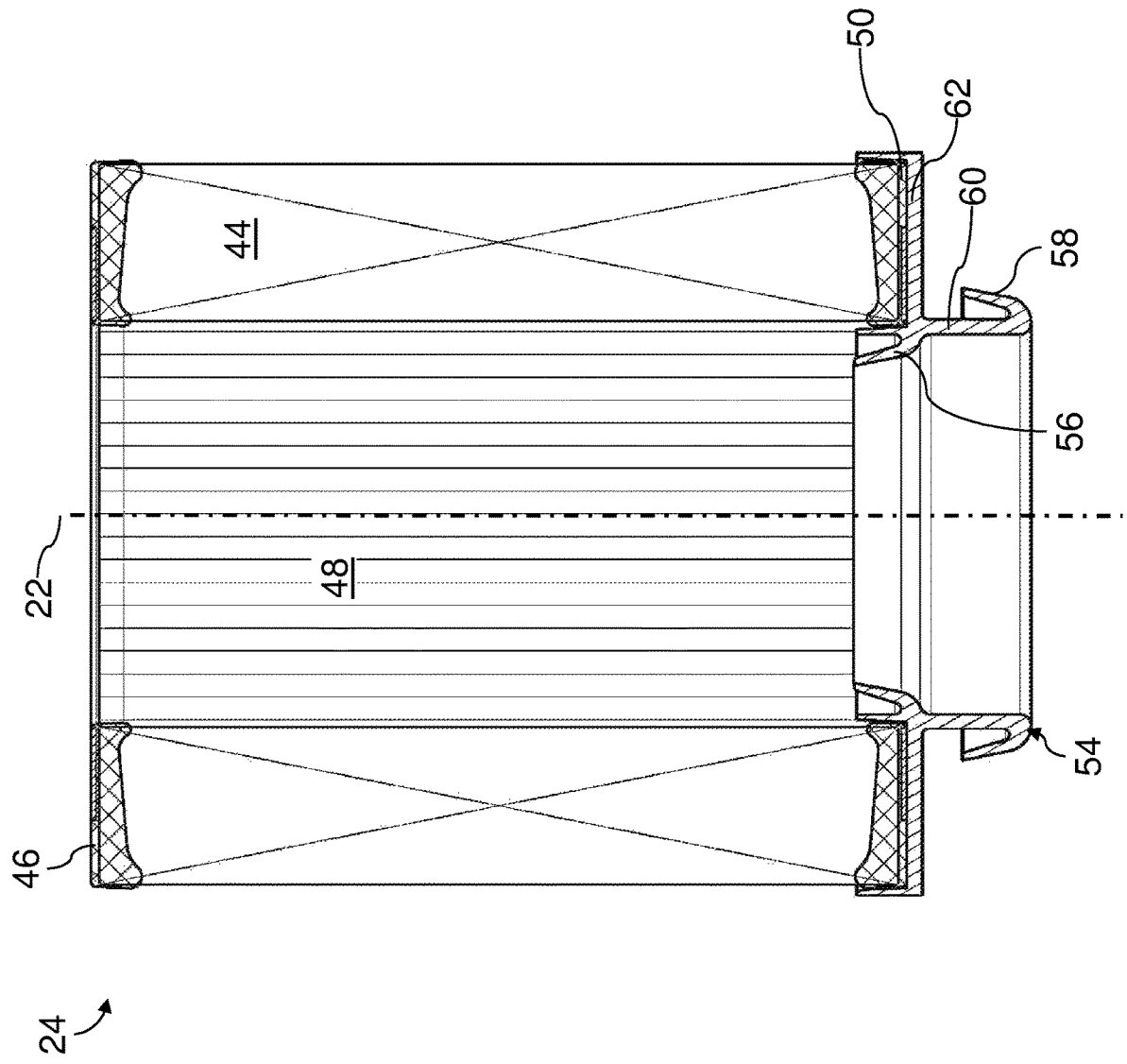

FILTER ELEMENT OF A FLUID FILTER AND FLUID FILTER

CROSS-REFERENCE TO RELATED APPLICATIONS

This application is a continuation application of international application No. PCT/EP2017/051975 having an international filing date of 31 Jan. 2017 and designating the United States, the international application claiming a priority date of 1 Feb. 2016, based on prior filed German patent application No. 10 2016 001 025.8, the entire contents of the aforesaid international application and the aforesaid German patent application being incorporated herein by reference.

BACKGROUND OF THE INVENTION

The invention concerns a filter element of a liquid filter, in particular of an oil filter or fuel filter, in particular of an internal combustion engine, in particular of a motor vehicle, for in particular exchangeable arrangement in a filter housing of the liquid filter, wherein the filter element comprises at least one filter medium which surrounds an element interior circumferentially relative to an element axis, wherein a radially inner circumferential side of the at least one filter medium at least partially forms an outflow side of the filter element for the clean fluid at the clean fluid side and a radially outer circumferential side an inflow side of the filter element for the raw fluid at the raw fluid side, or vice versa, and wherein the filter element comprises at least one sealing element arrangement of a sealing device arranged at least in sections at an end face at the at least one filter medium for sealing at least one fluid connection between at least one liquid discharge line of the filter housing, on the one hand, and the raw fluid side and/or the clean fluid side of the filter element, on the other hand, wherein the at least one sealing element arrangement comprises at least one radially inner sealing element relative to the element axis and at least one radially outer sealing element, and wherein the sealing elements each extend circumferentially relative to the element axis Moreover, the invention concerns a liquid filter, in particular an oil filter or fuel filter, in particular of an internal combustion engine, in particular of a motor vehicle, with a filter housing that comprises at least one inlet for liquid to be cleaned, at least one outlet for cleaned liquid, and at least one liquid discharge line for discharging the liquid from the filter housing in particular for servicing purposes, wherein the liquid filter comprises at least one filter element which is arranged in particular exchangeably in the filter housing such that it separates the at least one inlet from the at least one outlet, wherein the filter element comprises at least one filter medium which surrounds circumferentially an element interior relative to an element axis, wherein a radially inner circumferential side of the at least one filter medium at least partially forms an outflow side of the filter element for the clean fluid at the clean fluid side and a radially outer circumferential side an inflow side of the filter element for the raw fluid at the raw fluid side, or vice versa, and wherein the filter element comprises at least one sealing element arrangement of a sealing device arranged at least in sections at an end face at the at least one filter medium for sealing at least one fluid connection between the at least one liquid discharge line, on the one hand, and the raw fluid side and/or the clean fluid side of the filter element, on the other hand, wherein the at least one sealing element arrangement comprises at least one radially inner sealing element relative to the element axis and at least one radially outer sealing element, and wherein the sealing elements each extend circumferentially relative to the element axis, and wherein the at least one liquid discharge line comprises at least one discharge channel, which is open toward the housing interior in which the at least one filter element is arranged and is closable at least partially with the at least one sealing element arrangement and extends circumferentially in particular continuously relative to the element axis, which is sealingly acted on or engaged by the at least one sealing element arrangement from the open side, and which comprises at least one radially inner sealing surface relative to the element axis and at least one radially outer sealing surface, each for seal-tight interaction with the corresponding sealing elements.

EP 2 070 575 A1 discloses a filter, in particular an oil filter for a motor vehicle, with a filter housing with a drainage channel. The filter element has a filter medium and can be embodied as round filter element with a folded bellows folded in a star shape. A double concentric seal for closing the drainage channel is attached to the filter element.

The invention has the object to configure a filter element and a liquid filter of the aforementioned kind in which in a simple way a sealing function of the sealing device of the at least one liquid discharge can be further improved, in particular under pressure load.

SUMMARY OF THE INVENTION

This object is solved according to the invention in that at least the sealing elements each comprise at least one sealing lip or are comprised thereof, which, relative to the element axis, extend in radial direction from the interior to the exterior, or vice versa, wherein the sealing elements are configured such that they are concave when viewed from a side which in operation of the liquid filter is loadable with pressure.

According to the invention, both sealing elements are configured as sealing lip or are provided with one. A sealing lip in accordance with the invention is fastened at a side, in particular radially inwardly or radially outwardly, indirectly or directly to the filter medium. Remote from the attachment, the sealing lip extends in radial direction from the interior to the exterior, or vice versa. With at least one section remote from the attachment, in particular at the side opposite the attachment, the sealing lip can interact sealingly with a corresponding counter sealing element, in particular a sealing surface, in particular associated with the liquid discharge line. Sealing lips can be loaded from an axially positioned side, relative to the element axis, in operation of the liquid filter with a liquid pressure and can thus be pressed with a corresponding force more strongly against a corresponding counter sealing element associated with the liquid discharge line. The at least one sealing element arrangement on the part of the at least one sealing lip is pressure-assisted in operation of the liquid filter. In this way, the sealing action can be improved.

Moreover, sealing lips, remote from the attachment, can be movable axially relative to the element axis. Installation forces and removal forces can be smaller when using sealing lips in comparison to using other types of sealing elements, in particular cylindrical seals as they are employed in the filter elements known in the prior art.

Moreover, requirements with regard to possible insertion aid, in particular insertion ramps, may be reduced for the sealing element arrangement associated with the liquid discharge line when using sealing lips. The use of insertion aids can even be eliminated when using sealing lips. In this way, an installation space of the filter housing and/or of the filter element can be reduced correspondingly. The filter element as a whole can be designed to be shorter in axial direction.

By means of the at least one radially inner sealing element and the at least one radially outer sealing element, the sealing element arrangement can seal on opposite sides. Accordingly, the sealing element arrangement can seal the liquid discharge line relative to the raw fluid side and relative to the clean fluid side simultaneously but still separate from each other. In this context, depending on the flow direction of the liquid through the filter medium, at least a radially inner sealing element can seal relative to the clean fluid side and at least one radially outer sealing element can seal relative to the raw fluid side. In opposite flow direction, at least one radially inner sealing element can seal relative to the raw fluid side and, correspondingly, at least one radially outer sealing element relative to the clean fluid side.

The filter element can advantageously be introduced relative to the element axis in axial direction by means of a rotary and/or insertion movement into the filter housing. In this context, automatically the at least one sealing element arrangement at the end face of the filter element can be joined sealingly with corresponding counter sealing elements, in particular sealing surfaces, associated with the at least one liquid discharge line and can seal correspondingly the at least one liquid discharge line relative to the clean fluid side and/or the raw fluid side.

When removing the filter element from the filter housing, the sealing elements can also be removed automatically so that at least one fluid connection of the at least one liquid discharge line can be released relative to the clean fluid side and/or relative to the raw fluid side. The cleaned liquid, i.e, the clean fluid, and/or the liquid to be cleaned, i.e, the raw fluid, can thus be drained from the filter housing and/or the element interior through the at least one liquid discharge line. The drained liquid can be collected in a collecting container. When using the invention in connection with a motor oil filter of a motor oil circuit in particular of a motor vehicle, the motor oil drained from the filter housing can be collected in an oil pan of the internal combustion engine.

The at least one sealing element arrangement in connection with corresponding counter sealing element, in particular sealing surfaces, associated with the at least one liquid discharge line can be designed such that the fluid connections to the raw fluid side or to the clean fluid side can be released sequentially upon removal of the filter element. In this way, a mixing of the cleaned liquid with the liquid to be cleaned can be avoided. Advantageously, the at least one sealing element arrangement in connection with corresponding counter sealing elements can be designed such that the connection to the raw fluid side is released prior to the connection to the clean fluid side. In this way, the dirty liquid can be drained through the liquid discharge line before it can reach the clean fluid side.

Advantageously, at least one of the sealing elements can extend circumferentially continuously. In this way, it is possible to seal circumferentially continuously with the at least one sealing element. Thus, with the at least one sealing element, in particular the sealing element arrangement, a circumferentially continuous discharge channel can be closed off circumferentially continuously.

Advantageously, the at least one liquid discharge line can comprise at least one circumferentially in particular continuous discharge channel relative to a housing axis, in particular an element axis, which is initially open without the filter element being installed toward the housing interior in which the at least one filter element is arranged or can be arranged. A radially inner circumferential wall of the discharge channel relative to the housing axis, in particular the element axis, can comprise at least one radially inner sealing surface for sealing interaction with at least one corresponding radially inner sealing element of the filter element. A radially outer circumferential wall of the discharge channel relative to the housing axis, in particular the element axis, can comprise at least one radially outer sealing surface for sealing interaction with at least one corresponding radially outer sealing element.

Advantageously, the filter element can be realized as a hollow filter element. A hollow filter element is characterized in that it comprises at least one element interior which is surrounded by a filter bellows with filter medium. The filter medium can be flowed through by the fluid to be cleaned from the exterior to the interior toward the element interior, or vice versa. The element interior comprises a fluid passage to the exterior through which, depending on the flow direction, the cleaned fluid can exit from the element interior or fluid to be cleaned can flow into it.

The hollow filter element can be advantageously a round filter element with a round cross section, an oval round filter element with an oval cross section, a flat oval round filter element with a flattened oval cross section, a conical round filter element in which the round cross section tapers in axial direction relative to a main axis, a conical oval round filter element in which the oval cross section tapers in axial direction at least in direction of a transverse axis, a conical flat oval round filter element in which the flat oval cross section tapers in axial direction at least in direction of a transverse axis, or a hollow filter element with a different type of, in particular an angular, cross section, and/or a different type of axial cross section course in direction of an element axis.

The filter medium can advantageously be circumferentially closed or open relative to the element axis. The filter medium can in particular be folded in a star shape, preferably zigzag-shaped or corrugated, or bent. The filter medium can also be not folded or not bent.

The filter medium can be filter paper, filter fleece, filter foam, meltblown, nonwoven, fabric or a different type of filter medium suitable for filtration of liquid fluid, in particular oil or fuel, or a combination of different filter media. The filter medium can be a single layer or multilayered. Advantageously, the filter medium can be foldable and/or bendable.

The filter medium can be formed to a filter bellows, in particular folded.

The filter bellows can be realized also as a massive block of a corresponding filter medium, in particular of a filter foam.

The filter element can advantageously be part of a motor oil filter of an internal combustion engine of a motor vehicle. The motor oil filter can advantageously be part of a motor oil circuit of the internal combustion engine. It can serve for purifying motor oil which is supplied to the internal combustion engine. The invention is however not limited to a motor oil filter of a motor oil circuit of an internal combustion engine of a motor vehicle. Instead, it can also be used in other types of liquid systems, in particular fuel systems or hydraulic systems, of motor vehicles or other machines. The liquid filter can also be used outside of the automotive field, in particular in industrial motors.

According to the invention, the at least one radially outer sealing element and the at least one radially inner sealing element each comprise at least one sealing lip which, relative to the element axis, extends in radial direction from the interior to the exterior, or vice versa.

In this way, the sealing element arrangement can be pressure-assisted radially inwardly as well as radially outwardly by the corresponding sealing lip in operation of the liquid filter.

In a further advantageous embodiment, at least one radially inner sealing element and at least one radially outer sealing element, viewed axially relative to the element axis, can be positioned at one level. In this way, the at least one sealing element arrangement can be constructed in a space-saving way in axial direction relative to the element axis.

In a further advantageous embodiment, at least one radially inner sealing element and at least a radially outer sealing element, viewed axially relative to the element axis, can be displaced relative to each other at different levels. In this way, a closing characteristic and/or an opening characteristic of the at least one sealing element arrangement during installation of the filter element or during removal can be predetermined correspondingly. Correspondingly, the counter sealing elements, in particular sealing surfaces, associated with the at least one liquid discharge line can be arranged differently, correspondingly displaced relative to each other.

Corresponding radially inner and radially outer sealing surfaces associated with the at least one liquid discharge line can advantageously be positioned axially at the same level, viewed relative to the element axis. In combination with radially inner and radially outer sealing elements of the filter element which are positioned at the same level, the fluid connections of at least one liquid discharge line can thus be simultaneously released relative to the raw fluid side and relative to the clean fluid side upon removal of the filter element. In combination with radially inner and radially outer sealing elements of the filter element that are axially displaced relative to each other, the fluid connections of at least one liquid discharge relative to the raw fluid side and relative to the clean fluid side can be correspondingly released one after the other.

Alternatively, advantageously corresponding radially inner and radially outer sealing surfaces associated with the at least one liquid discharge line, viewed relative to the element axis, can be axially displaced relative to each other and/or, viewed axially relative to the element axis, end at a different level. In combination with radially inner and radially outer sealing elements of the filter element which are positioned at the same level, in this way the fluid connections of at least one liquid discharge relative to the raw fluid side and relative to the clean fluid side can be released one after the other upon removal of the filter element. In combination with radially inner and radially outer sealing elements of the filter element which in the same manner are axially displaced relative to each other like the radially inner and the radially outer sealing surfaces associated with the at least one liquid discharge, the fluid connections of the at least one liquid discharge relative to the raw fluid side and relative to the clean fluid side can be released correspondingly one after the other or simultaneously. In the latter case, the displacements of the element-associated sealing elements, on the one hand, and the displacements of the housing-associated sealing surfaces, on the other hand, can cancel each other so that the fluid connections of the at least one liquid discharge relative to the raw fluid side and relative to the clean fluid side can be released correspondingly simultaneously.

In a further advantageous embodiment, at least one sealing element, in particular at least one sealing element arrangement, can be connected as one piece (monolithic) or multiple pieces by means of at least one connecting section, in particular a connecting ring, indirectly or directly, detachably or detachably with destruction, with the at least one filter medium and/or optionally with a support tube.

Advantageously, at least one sealing element, in particular at least one sealing element arrangement, can be connected by means of at least one connecting section directly with the at least one filter medium. The at least one sealing element, in particular the at least one sealing element arrangement, can advantageously be glued by means of the at least one connecting section to the at least one filter medium.

Alternatively, advantageously at least one sealing element, in particular at least one sealing element arrangement, can be connected by means of at least one connecting section indirectly with the at least one filter medium. The at least one sealing element, in particular at least one sealing arrangement, can advantageously be connected by means of the at least one connecting section with at least one end body, in particular an end disc, of the filter element. The at least one end body can advantageously be connected at the end face with the at least one filter medium.

In a further advantageous embodiment, at least one radially inner sealing element can be arranged radially inwardly on at least one support section, in particular on at least one support section of the at least one sealing element arrangement, and/or optionally on at least one connecting section, and at least one radially outer sealing element can be arranged radially outwardly in particular at the same at least one support section and/or another support section.

Advantageously, at least one radially inner sealing element and at least one radially outer sealing element can be realized as one piece (monolithic) together with at least one support section. In this way, the sealing element arrangement with the at least one support section can be produced and installed together in a simple way. In this way, a manufacturing expenditure and/or a mounting expenditure can be reduced.

At least one radially inner sealing element and at least one radially outer sealing element can be realized as one piece (monolithic) on the same support section. In this way, a manufacturing expenditure and/or mounting expenditure can be further reduced. Alternatively, at least one radially inner sealing element can be arranged on a first support section and at least one radially outer sealing element on a second support section.

Advantageously, at least one radially inner sealing element can be arranged at a support section and at least one radially outer sealing element at another support section.

Advantageously, one of the support sections can be realized at/with a support tube. Advantageously, at least one of the sealing elements can be realized as a two-component part with at least one support section.

Advantageously, corresponding connections between at least one sealing element, in particular at least one sealing element arrangement, at least one filter element, optionally at least one end body, optionally at least one connecting section, optionally at least one support section and/or optionally at least one support tube can be indirectly or directly connected, optionally respectively among each other, by means of at least one material-fused and/or form-fit and/or a frictional connection, in particular a fitting, an insertion connection, an adhesive connection, a weld connection, in particular ultrasound weld connection, a soldered connection, a clamping connection, a locking connection, a push-through connection, a sewn connection, a clip connection, a bonding connection, a hook and loop fastener connection, an embossed connection, a rotary and/or insertion connection, in particular a screwing connection and/or a bayonet type connection, or the like or a combination of several connection types. The materials and/or structures of the components to be connected to each other can penetrate each other in order to be connected. One of the components to be connected can be embedded at least partially in the material of the corresponding other component, in particular by injection molding and/or casting, or can be enveloped by it.

Alternatively or additionally, at least two components listed in the last paragraph can also be realized together as one piece. In this way, a manufacturing expenditure and/or mounting expenditure can be further reduced.

In a further advantageous embodiment at least one radially inner sealing element and at least one radially outer sealing element can be connected to each other as one piece and/or at least one radially inner sealing element and at least one radially outer sealing element can be realized as multiple parts, in particular not directly connected to each other.

Sealing elements that are connected as one piece with each other can be produced and mounted together.

Multi-part sealing elements can be separately manufactured. Multi-part sealing elements can be realized from different materials and/or according to different manufacturing methods. Moreover, multi-part sealing elements can be attached to different parts of the filter element. The sealing elements can be connected as multiple parts with each other or not directly connected to each other.

Advantageously, at least one sealing element, in particular a radially inner sealing element, can be connected optionally with a support tube of the filter element, in particular by means of a support section. Advantageously, at least one other sealing element, in particular a radially outer sealing element, can be connected with an end body, in particular an end disc.

According to the invention, the sealing elements are concave, when viewed from a side that in operation of the liquid filter is loadable with pressure, in particular the raw fluid side and/or the clean fluid side. In this way, the corresponding sealing element by means of the pressure can be pushed better against the at least one corresponding counter sealing element, in particular the corresponding sealing surface, associated with the liquid discharge line. In this way, a sealing function can be further improved.

Moreover, a curved shape of at least one sealing element can simplify an installation and/or a removal of the filter element, in particular can reduce required installation forces and/or removal forces and/or simplify positioning.

In a further advantageous embodiment, at least one sealing element, in particular a radially inner sealing element, can be arranged within the element interior and/or at least one sealing element, in particular a radially inner sealing element and/or a radially outer sealing element, can be arranged outside of the element interior.

At least one sealing element can be arranged in a space-saving way and/or in a protected way within the element interior.

In addition or as an alternative, at least one sealing element can be arranged outside of the element interior to be accessible easily from the exterior. A sealing element arranged outside of the element interior, viewed axially relative to the element axis, can engage or be inserted farther into a corresponding sealing arrangement associated with the liquid discharge line, in particular a discharge channel.

In a further advantageous embodiment, at least one sealing element, in particular at least one sealing element arrangement, can be at least partially elastic, in particular comprise at least partially an elastic plastic material. With an at least partially elastic sealing element it is possible in a simpler and/or better way to compensate possible tolerances, in particular operationally caused and/or component-related tolerances. With elastic components, operationally caused vibrations, in particular pressure pulsations, can be compensated better. Moreover, a pressure assistance in operation of the liquid filter can act better on the at least one at least partially elastic sealing element.

In case of elastic bodies or materials, inner tensions are created under the action of deforming forces which attempt to reverse the created deformation and even at least partially achieve this upon cancellation of the force action in case of an elastic deformation.

Also, an at least partially elastic sealing element can be more easily elastically deformed upon installation of the filter element into the filter housing and/or upon removal. In this way, corresponding installation forces and/or removal forces can be further reduced.

Advantageously, at least one sealing element, in particular at least one sealing element arrangement, can be produced simply of plastic material, in particular injection molded and/or cast. Plastic material can be easily processed.

At least one sealing element, in particular at least one sealing element arrangement, can be advantageously made completely of an elastic plastic material.

Moreover, the object in regard to the liquid filter is solved according to the invention in that at least one sealing element comprises at least one sealing lip or is comprised thereof, which extends, relative to the element axis, in radial direction from the interior to the exterior, or vice versa.

A suitable filter housing comprises at least one inlet for liquid to be cleaned, at least one outlet for cleaned liquid, and at least one liquid discharge line for discharging the liquid from the filter housing in particular for servicing purposes, wherein in the filter housing at least one filter element can be arranged in particular exchangeably in such a way that the at least one filter element separates the at least one inlet from the at least one outlet, and wherein the at least one liquid discharge line comprises at least one discharge channel that is open toward the housing interior that serves for receiving the at least one filter element, is closable at least partially with the at least one sealing element arrangement of the at least one filter element, and, relative to a housing axis, in particular element axis, is circumferentially in particular continuous, with at least one radially inner sealing surface and at least one radially outer sealing surface for seal-tight interaction with at least one corresponding radially inner sealing element and at least one radially outer sealing element of the at least one sealing element arrangement, respectively.

In other respects, the features and advantages which have been mentioned in connection with the filter element according to the invention, the liquid filter according to the invention, and the filter housing and their respective advantageous embodiments apply respectively among each other, and vice versa. The individual features and advantages can of course be combined among each other wherein further advantageous effects may result which go beyond the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in the drawing, the description, and the claims in combination also individually and combine them to other meaningful combinations.

FIG. 1 shows an isometric longitudinal section of a motor oil filter of an internal combustion engine of a motor vehicle according to a first embodiment, with a housing pot, without housing cover, in which an exchangeable filter element is arranged.

FIG. 2 shows the longitudinal section of the motor oil filter of FIG. 1.

FIG. 3 shows the longitudinal section of the filter element of the motor oil filter of FIGS. 1 and 2.

FIG. 4 shows an isometric longitudinal section of a motor oil filter of an internal combustion engine of a motor vehicle according to a second embodiment, with a housing pot, without housing cover, in which exchangeably a filter element is arranged.

FIG. 5 shows the longitudinal section of the motor oil filter of FIG. 4.

FIG. 6 shows the longitudinal section of the filter element of the motor oil filter of FIGS. 4 and 5.

In the Figures same components are provided with same reference characters.

DESCRIPTION OF PREFERRED EMBODIMENTS

Figure 7:
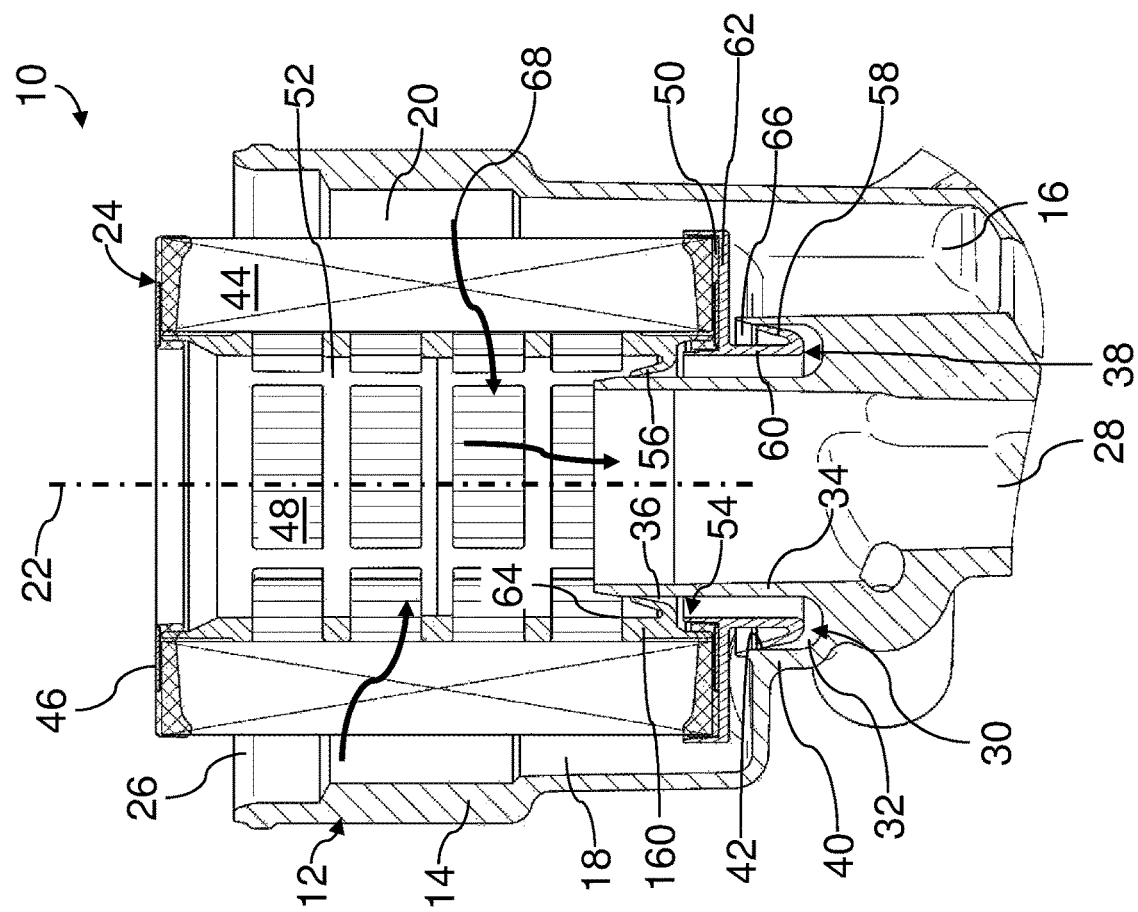
FIG. 7 shows a third embodiment of a motor oil filter.

In FIGS. 1 and 2, an oil filter 10 according to a first embodiment for motor oil of a motor oil circuit of an internal combustion engine, not illustrated otherwise, of a motor vehicle is illustrated in a longitudinal section in an exemplary operation-ready installation orientation.

The oil filter 10 comprises a filter housing 12 with a filter pot 14 which is closed off by a housing cover, not illustrated. In FIGS. 1 and 2, the housing pot 14 is shown fixedly connected to the internal combustion engine or a frame part of the motor vehicle.

The housing pot 14 comprises at the bottom an inlet 16 for motor oil to be filtered. The inlet 16 is connected with the motor oil circuit. The inlet 16 opens into a raw oil-associated annular inlet space 18 of the housing pot 14.

A housing interior 20 of the filter housing 12 is coaxial to an axis 22. The housing interior 20 serves as an installation space for a filter element 24. The axis 22 coincides in the embodiment with a housing axis of the filter housing 12, an installation/removal axis of the filter element 24 into the housing pot 14, and an element axis of the filter element 24. For clarity of the illustration, in the following the element axis, the housing axis, and the installation/removal axis are identified with the same reference character 22 and are referred to as axis 22 for short. It is understood that with the filter element 24 removed, depending on the context, the housing axis, the element axis and/or the installation/removal axis is intended. When in the following "radial", "coaxial", "axial", "circumferential" or the like is referred to, this relates to the axis 22, if nothing to the contrary is mentioned.

At an end face, in FIGS. 1 and 2 at the top, the housing pot 14 comprises a coaxial installation opening 26 for the filter element 24. In the operation-ready state, the installation opening 26 is closed off with the housing cover. At the axially oppositely positioned end face, in FIGS. 1 and 2 at the bottom, an outlet 28 extends through the housing bottom out of the housing pot 14. In a section which is axially facing the housing interior 20, the radially inner circumferential side of the outlet 28 is coaxial to the axis 22. The outlet 28 is connected outside of the filter housing 12 with the motor oil circuit.

Moreover, the housing pot 14, also spatially at the bottom in the normal operating orientation, comprises an oil discharge line 30, which is substantially hidden in the FIGS., for discharging the motor oil from the filter housing 12, for example, when exchanging the filter element 24.

The oil discharge line 30 comprises a coaxial discharge channel 32 which is open toward the housing interior 20 and toward the filter element 24 and is circumferentially continuous. The discharge channel 32 surrounds an outlet opening of the outlet 28 radially outwardly. It is located radially between the inlet 16 and the outlet 28.

A radially inner circumferential wall 34 of the discharge channel 32 forms at its radially outer circumferential side a radially inner sealing surface 36 of a sealing device 38. A radially outer circumferential wall 40 of the discharge channel 32 forms at its radially inner circumferential side a radially outer sealing surface 42. The radially inner circumferential wall 34 of the discharge channel 32 projects, viewed in axial direction, somewhat farther into the housing interior 20 than the radially outer circumferential wall 40.

The filter element 24 is arranged in the filter housing 12 such that it separates the inlet 16 from the outlet 28.

The filter element 24, which is shown in detail in FIG. 3, comprises a zigzag-folded circumferentially closed filter medium 44 in the form of a filter fleece. At its end face that is facing away axially from the housing bottom of the housing pot 14, the filter medium 44 is seal-tightly connected with an annular cover-associated end disc 46. In the opening of the cover-associated end disc 46, a bypass valve is arranged, not shown in FIGS. 1 and 2, which is not of interest in this context. In normal operation, the cover-associated end disc 46 with the bypass valve closes off a coaxial element interior 48 of the filter element 24 at the cover-associated end face. The element interior 48 is surrounded circumferentially by the filter medium 44. At the raw oil side, a radially outer circumferential side of the filter medium 44 forms an inflow side for the motor oil (raw oil) to be cleaned. At the clean oil side of the filter element 24, a radially inner circumferential side of the filter medium 44 forms an outflow side for the cleaned motor oil (clean oil).

At the end face which is facing the housing bottom of the housing pot, the filter medium 44 is seal-tightly connected with a bottom-associated end disc 50. The bottom-associated end disc 50 is of an annular configuration. It surrounds a coaxial through opening. The radially inner circumferential wall 34 of the discharge channel 32 extends coaxially into the through opening and forms the outlet 28 there. A diameter of the through opening is greater than the corresponding diameter of the radially inner circumferential wall 34 of the discharge channel 32 and smaller than the corresponding diameter of the radially outer circumferential wall 40 of the discharge channel 32. The diameter of the through opening lies with its amount approximately at the middle between the diameters of the circumferential walls 34 and 40 of the discharge channel 32.

The end discs 46 and 50 are made of plastic material in an exemplary fashion. They can also be made of a different material. The end discs 46 and 50 can be realized, for example, as film end discs. They can be, for example, foamed, glued, fused to the filter medium 44 or connected seal-tightly in other ways.

At the end face at the filter medium 44, a sealing element arrangement 54 of the sealing device 38 is arranged externally at the bottom-associated end disc 50. The sealing device 38 serves for sealing oil connections between the oil discharge line 30, on the one hand, and the raw oil side and the clean oil side of the filter element 24, on the other hand. The sealing element arrangement 54 as a whole is coaxial to the axis 22.

The sealing element arrangement 54 comprises a radially inner sealing element in the form of a radially inner sealing lip 56 and a radially outer sealing element in the form of a radially outer sealing lip 58. The sealing lips 56 and 58 are each circumferentially continuous. The sealing lips 56 and 58 are arranged outside of the element interior 48. The sealing lips 56 and 58 are arranged, viewed axially relative to the axis 22, at one level.

The radially inner sealing lip 56 is concave, viewed from the element interior 48, i.e, the clean oil side. The radially outer sealing lip 58 is concave, viewed from the bottom-associated end disc 50, i.e., the raw oil side.

The sealing lips 56 and 58 are each formed as one piece (monolithic) together with a circular cylinder-shaped coaxial support section 60 of the sealing element arrangement 54. The radially inner sealing lip 56 is connected with its radially outer side with the support section 60. The radially inner sealing lip 56 extends in radial direction from the exterior to the interior. The radially outer sealing lip 58 is connected with its radially inner side with the support section 60. It extends in radial direction from the interior to the exterior.

The diameter of the support section 60 corresponds approximately to the diameter of the through opening of the bottom-associated end disc 50. The diameter lies with its amount approximately at the middle between the radially outer diameter and the radially inner diameter of the discharge channel 32 of the housing pot 14.

The support section 60 passes monolithically into a coaxial annular disc-shaped connecting section 62 of the sealing element arrangement 54. The connecting section 62 extend circumferentially and, viewed from the support section 60, in radial direction outwardly. Radially outwardly, the connecting section 62 is bent coaxially cylinder-shaped toward the filter medium 44 on the side which is axially opposite the support section 60 and engages circumferentially around it and around the bottom-associated end disc 50. The connecting section 62 extends flat along the exterior side of the bottom-associated end disc 50 and is glued thereto. By means of the connecting section 62, the sealing element arrangement 54 is connected indirectly with the bottom-associated end disc 50 of the filter element 24. The bottom-associated end disc 50, in turn, is connected with the filter medium 44. In this way, the sealing lips 56 and 58 are connected indirectly with the filter medium 44.

The radially inner sealing lip 56, the radially outer sealing lip 58, the support section 60, and the connecting section 62 are produced as one piece (monolithic) from an elastic plastic material.

With correctly mounted filter element 24, the support section 60 projects with the sealing lips 56 and 58 into the discharge channel 32.

The support section 60 delimits with the radially inner circumferential wall 34 of the discharge channel 32 a coaxial annular outlet gap 64 associated with the clean oil side. The clean oil side-associated outlet gap 64 is fluidically connected with the element interior 48 and the outlet 28, i.e., the clean oil side. The clean oil side-associated outlet gap 64 is fluidically located between the element interior 48 and the oil discharge line 30. The radially inner sealing lip 56 is positioned seal-tightly against the radially inner sealing surface 36. The radially inner sealing lip 56 closes off the clean oil side-associated outlet gap 64 in the discharge channel 32 relative to the oil discharge line 30.

The support section 60 delimits moreover with the radially outer circumferential wall 40 of the discharge channel 32 a coaxial annular raw oil side-associated outlet gap 66. The raw oil side-associated outlet gap 66 is fluidically connected at the raw oil side with the inlet 16 and the annular inlet space 18. The raw oil side-associated outlet gap 66 is located fluidically between the raw oil side-associated inlet 16 and the annular inlet space 18, on the one hand, and the discharge line 30, on the other hand. The radially outer sealing lip 58 is positioned seal-tightly against the radially outer sealing surface 42. The radially outer sealing lip 58 closes off, with correctly mounted filter element 24, the raw oil side-associated outlet gap 66 in the discharge channel 32 relative to the oil discharge line 30.

In operation of the internal combustion engine, motor oil flows from the motor oil circuit through the inlet 16 into the raw oil side-associated annular inlet space 18. The motor oil flows through the filter medium 44, indicated by arrows 68, in radial direction from the exterior to the interior, is filtered, and reaches the element interior 48. From here, the cleaned motor oil flows through the through opening into the outlet 28. The cleaned motor oil flows into an outlet line through which it is guided from the oil filter 10 into the motor oil circuit.

In the operation-ready installation state, the sealing element arrangement 54 closes off the discharge channel 32 seal-tightly so that no motor oil from the housing pot 14 can flow into the discharge line 30, neither from the clean oil side nor from the raw oil side.

In operation of the oil filter 10, the concave sides of the sealing lips 56 and 58 are loaded with the respective oil pressure. At the clean oil side, a pressure of approximately 2.8 bar may be present, for example. At the raw oil side, a pressure of approximately 3 bar may be present, for example. At the opposite convex side of the sealing lips 56 and 58, the pressure of the oil discharge line 30 is present. In comparison to the raw oil side and the clean oil side, the oil discharge line 30 is essentially pressure-free. The sealing lips 56 and 58 are pressed by the respective oil pressure more strongly against the corresponding sealing surfaces 34 and 36.

When removing the filter element 24, the housing cover is removed from the housing pot 14. The filter element 24 is pulled axially out of the housing pot 14 in removal direction. In this context, the radially inner sealing lip 56 automatically releases the clean oil side-associated element interior 48 and the outlet 28 relative to the discharge line 30. The radially outer sealing lip 58 at the same time releases correspondingly the raw oil side-associated annular inlet space 18 relative to the discharge line 30. The motor oil from the annular inlet space 18 and from the element interior 48 flows through the discharge line 30 out of the filter housing 12 into the oil pan. In this way, it can be avoided that the motor oil can reach in an uncontrolled fashion the environment when exchanging the filter element 24.

For installation, the filter element 24 is axially inserted, in installation direction opposite to the removal direction, with the sealing element arrangement 54 leading through the installation opening 26 into the housing pot 14. In doing so, the sealing lips 56 and 58 glide along the corresponding sealing surfaces 34 and 36 into the discharge channel 32. In this context, the concavely shaped sealing lips 56 and 58 facilitate the installation. In the correct installation position of the filter element 24, the sealing lips 56 and 58 close off the oil discharge line 30, on the one hand, at the clean oil side relative to the element interior 48 and relative to the outlet 28 and, on the other hand, at the raw oil side relative to the annular inlet space 18 and the inlet 16.

Finally, the housing pot 14 is closed by the housing cover.

In FIGS. 4 to 6, a second embodiment of a motor oil filter 10 is illustrated. Those elements that are similar to those of the first embodiment of FIGS. 1 to 3 are provided with the same reference characters. The second embodiment differs from the first embodiment in that the radially inner sealing lip 56 and the radially outer sealing lip 58, viewed axially relative to the axis 22, are positioned displaced relative to each other at different levels. The radially inner sealing lip 56 is arranged within the element interior 58. The radially outer sealing lip 58 is arranged outside of the element interior 48.

Moreover, the radially inner circumferential wall 34 of the discharge channel 32 extends farther into the housing interior 20 than the radially outer circumferential wall 40 in comparison to the first embodiment. For correctly mounted filter element 24, the radially inner circumferential wall 34 projects to a significant extent into the element interior 48 of the filter element 24.

When removing the filter element 24, first the radially outer sealing lip 58 releases the oil connection between the raw oil side-associated annular inlet space 18 and the discharge line 30. The raw oil contained in the filter housing 12 can thus flow out via the discharge line 30 without reaching the clean oil side. Only upon further pulling out of the filter element 24, the radially inner sealing lip 56 releases the oil connection between the clean oil side-associated element interior 48 and the outlet 28, on the one hand, and the discharge line 30, on the other hand, so that the clean oil contained in the element interior 48 can also drain through the discharge line 30.

The installation of the filter element 24 is realized correspondingly in reverse sequence.

In FIG. 7 a third embodiment of a motor oil filter 10 is illustrated. Those elements which are similar to those of the second embodiment of FIGS. 4 to 6 are provided with the same reference characters. The third embodiment differs from the second embodiment in that the radially inner sealing lip 56 is arranged at a separate support section 160. The support section 160 is fastened at a radially inner circumferential side of the support tube 52. The radially inner sealing lip 56 and the radially outer sealing lip 58 are realized with the respective support sections 60 and 160 as multi-part components; for example, the support section 160 could also be connected as one piece (monolithic) together with the support section 60. The support section 160 can be part of a support tube 52. The radially inner sealing lip 56 can be realized, for example, as a two-component part with the support section 160.

The support tube 52 of plastic material extends coaxially in the element interior 48 between the end discs 46 and 50. The filter medium 44 can be supported with its radially inner circumferential side at the radially outer circumferential side of the support tube 52. The support tube 52 with its ends is connected respectively to the end discs 46 and 50. The circumferential wall of the support tube 52 is permeable to motor oil.

What is claimed is:
1. A filter element of a liquid filter, the filter element comprising:
at least one filter medium surrounding an element interior circumferentially relative to an element axis of the filter element,
wherein the at least one filter medium is circumferentially closed and circumferentially surrounding a filter element axis which extends through the element interior,
wherein an axial direction, as used herein, refers to the direction of the filter element axis,
wherein a radial direction, as used herein, is relative to the filter element axis;
wherein the filter element comprises a raw fluid side and a clean fluid side separated from each other by the at least one filter medium;
wherein the at least one filter medium comprises
a radially inner circumferential side and
further comprises a radially outer circumferential side,
wherein the radially inner circumferential side at least partially forms an inflow side for raw fluid at the raw fluid side and
the radially outer circumferential side forms at least partially an outflow side for clean fluid at the clean fluid side, or
the radially outer circumferential side at least partially forms the inflow side for the raw fluid at the raw fluid side and
the radially inner circumferential side at least partially forms the outflow side for the clean fluid at the clean fluid side;
an annular end disk secured onto and covering a first axial end face of the at least one filter medium, the annular end disk having a central through opening which opens into the element interior;
an elastic sealing device formed in one piece of an elastic material, the elastic sealing device is arranged on and secured onto an axially outer side of the annular end disk, the elastic sealing device forming:
an annular support disc of the elastic sealing device arranged on and secured onto an axially outer side of the annular end disc, the annular support disc having a flow opening positioned to align with and open into the central through opening of the annular end disc;
a circular cylindrical projection formed on the annular support disc and circumferentially surrounding the flow opening, the circular cylindrical projection projecting axially outwardly and having an open interior forming a continuation of the flow opening of the annular support disc;
a first concave sealing lip having a first end formed on an axial outer end of the circular cylindrical projection and projecting both radially inwardly into the open interior of the circular cylindrical projection and projecting axially inwardly towards the element interior, such that a spacing between the first concave sealing lip and the circular cylindrical projection opens towards the element interior;
a second concave sealing lip having a first end formed on the axial outer end of the circular cylindrical projection and projecting both radially outwards away from the circular cylindrical projection and projecting axially inwardly towards the annular end disc, such that a spacing between the second concave sealing lip and the circular cylindrical projection opens towards the annular support disc;
wherein the elastic sealing device is configured to seal at least one fluid connection between at least one liquid discharge line of a filter housing of the liquid filter configured to receive the filter element and the raw fluid side and/or the clean fluid side of the filter element.

2. The filter element according to claim 1, wherein the first concave sealing lip and the second concave sealing lip, viewed axially relative to the element axis, are positioned at one and the same level.

3. The filter element according to claim 1, wherein the first concave sealing lip and the second concave sealing lip, viewed axially relative to the element axis, are positioned at different levels.

4. The filter element according to claim 1, wherein the filter element comprises a support tube configured to support the at least one filter medium, wherein the circular cylindrical projection connects the first concave sealing lip and/or the second concave sealing lip to the filter element and to the support tube.

5. The filter element according to claim 1, wherein the first concave sealing lip and the second concave sealing lip together form one piece.

6. The filter element according to claim 1, wherein the first concave sealing lip and the second concave sealing lip are not directly connected to each other.

7. The filter element according to claim 1, wherein the first concave sealing lip is arranged inside the element interior.

8. The filter element according to claim 7, wherein the second concave sealing lip is arranged outside of the element interior.

9. The filter element according to claim 1, wherein the first concave sealing lip and the second concave sealing lip are arranged outside of the element interior.

10. A liquid filter comprising:
a filter housing comprising
   at least one inlet for liquid to be cleaned,
   at least one outlet for cleaned liquid, and
   at least one liquid discharge line configured to discharge the liquid from the filter housing when servicing the liquid filter;
at least one filter element arranged exchangeably in a housing interior of the filter housing and configured to separate the at least one inlet from the at least one outlet;
   wherein the filter element comprises
      at least one filter medium surrounding circumferentially an element interior relative to an element axis of the filter element,
      wherein the at least one filter medium is circumferentially closed and circumferentially surrounding a filter element axis which extends through the element interior,
      wherein an axial direction, as used herein, refers to the direction of the filter element axis,
      wherein a radial direction, as used herein, is relative to the filter element axis;
      wherein the filter element comprises a raw fluid side and a clean fluid side separated from each other by the at least one filter medium;
      wherein the at least one filter medium comprises
         a radially inner circumferential side and
         further comprises a radially outer circumferential side,
            wherein the radially inner circumferential side at least partially forms an inflow side for raw fluid at the raw fluid side and the radially outer circumferential side forms at least partially an outflow side for clean fluid at the clean fluid side, or the radially outer circumferential side at least partially forms the inflow side for the raw fluid at the raw fluid side and the radially inner circumferential side at least partially forms the outflow side for the clean fluid at the clean fluid side;
      an annular end disk secured onto and covering a first axial end face of the at least one filter medium, the annular end disk having a central through opening which opens into the element interior;
      an elastic sealing device formed in one piece of an elastic material, the elastic sealing device is arranged on and secured onto an axially outer side of the annular end disk, the elastic sealing device forming:
         an annular support disc of the elastic sealing device arranged on and secured onto an axially outer side of the annular end disc, the annular support disc having a flow opening positioned to align with and open into the central through opening of the annular end disc;
         a circular cylindrical projection formed on the annular support disc and circumferentially surrounding the flow opening, the circular cylindrical projection projecting axially outwardly and having an open interior forming a continuation of the flow opening of the annular support disc;
         a first concave sealing lip having a first end formed on an axial outer end of the circular cylindrical projection and projecting both radially inwardly into the open interior of the circular cylindrical projection and projecting axially inwardly towards the element interior, such that a spacing between the first concave sealing lip and the circular cylindrical projection opens towards the element interior;
         a second concave sealing lip having a first end formed on the axial outer end of the circular cylindrical projection and projecting both radially outwards away from the circular cylindrical projection and projecting axially inwardly towards the annular end disc, such that a spacing between the second concave sealing lip and the circular cylindrical projection opens towards the annular support disc;
      wherein the elastic sealing device is configured to seal at least one fluid connection between the at least one liquid discharge line of the filter housing and the raw fluid side and/or the clean fluid side of the filter element;
   wherein the at least one liquid discharge line comprises at least one discharge channel,
      wherein the at least one discharge channel comprises an open side open toward the housing interior of the filter housing and is configured to be closed at least partially with the at least one sealing element arrangement;
      wherein the at least one discharge channel extends circumferentially continuously relative to the element axis and is sealingly engaged by the at least one sealing element arrangement from the open side;
      wherein the at least one discharge channel comprises
         at least one radially inner sealing surface relative to the element axis and
         at least one radially outer sealing surface relative to the element axis,
         wherein the at least one radially inner sealing surface and the at least one radially outer sealing surface are configured to interact seal-tightly with the first concave sealing lip and the second concave sealing lip.

* * * * *